Sept. 17, 1929.  W. H. VIBBER  1,728,280
CONDUIT GROUNDING BUSHING
Filed April 3, 1925
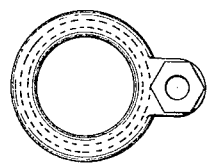
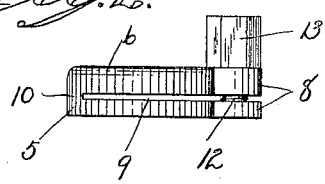
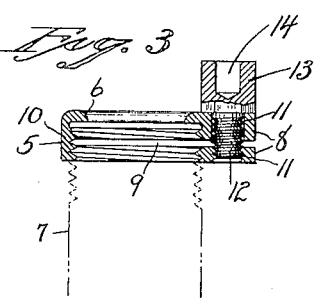

Patented Sept. 17, 1929

1,728,280

UNITED STATES PATENT OFFICE

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION

CONDUIT-GROUNDING BUSHING

Application filed April 3, 1925. Serial No. 20,385.

My invention relates to an improved conduit-grounding bushing, the object being to produce a bushing adapted to be simply and effectively locked upon the conduit and to provide means for bonding and grounding the same.

With these ends in view, my invention consists in a conduit-grounding bushing, having certain details of construction as will be hereinafter described and pointed out in the claim.

The accompanying drawings represent in Fig. 1 a top or plan view of a conduit-grounding bushing embodying my invention.

Fig. 2 a side view thereof.

Fig. 3 a view thereof in central section, showing its application to a conduit, which is shown in broken lines.

In carrying out my invention, as shown in Figs. 1 to 3 inclusive, I employ an annular bushing 5 having a concentric, inwardly-turned flange 6 at its outer end, and internally threaded to adapt it to be screwed over the threaded end of a standard conduit 7. The said bushing is formed with an integral, radially-extending ear 8, and is virtually bisected, as well as its said ear, by a slot 9 located in its plane and intersecting its internally-threaded portion, the said slot all but severing the bushing, the two complementary members of which are united at a point diametrically opposite the said ear 8 by a web 10 forming, as it were, an elastic hinge. The said ear is formed with a bore 11 for the reception of the shank 12 of a clamping-screw, the polygonal head 13 of which is formed with a socket 14 into which one end of a grounding or bonding wire may be inserted and soldered.

The upper portion of the bore 11 is large enough to permit the free passage of the screw-shank 12, while its lower portion is threaded for engagement thereby.

It will be readily understood that after such a bushing as described is applied to a conduit-pipe, it may be permanently locked thereupon by the screw which draws its two main parts together, so as to cramp it upon the threads of the conduit.

The opening of the annular flange 6 in the outer member of the bushing will substantially correspond in diameter to the internal diameter of the conduit, while the diameter of the threaded opening in the inner member of the bushing will correspond to the external diameter of the conduit, the difference in these diameters being substantially the thickness of the conduit itself.

I claim:

As a new article of manufacture, a one-piece annular conduit grounding-bushing comprising internally-threaded inner and outer rings of the same internal and external diameter, separated by a narrow space in their plane and united by an integral web connecting corresponding portions of their edges, the exposed portion of the outer ring being extended to form an annular flange projecting inwardly so as to overhang the circular passage through the fixture and each ring being formed at a point opposite the said web with an integral ear, of which that of the inner ring is provided with a threaded bore and that of the outer ring with a corresponding threadless bore; and a combined clamping-and-grounding screw installed in the said ears for seating the overhanging flange of the outer ring upon the end of the conduit for securing a close electrical union therewith.

In testimony whereof, I have signed this specification.

WHEELER H. VIBBER.